United States Patent
Wang et al.

(10) Patent No.: US 9,450,247 B2
(45) Date of Patent: Sep. 20, 2016

(54) PREPARATION METHOD OF OLIGOMER-POLYMER AND LITHIUM BATTERY

(71) Applicants: National Taiwan University of Science and Technology, Taipei (TW); Industrial Technology Research Institute, Hsinchu (TW)

(72) Inventors: Fu-Ming Wang, Hsinchu (TW); Bing-Joe Hwang, Taipei (TW); Chorng-Shyan Chern, Taipei (TW); Jung-Mu Hsu, Penghu County (TW); Wen-Han Li, Kaohsiung (TW)

(73) Assignees: National Taiwan University of Science and Technology, Taipei (TW); Industrial Technology Research Institute, Hsinchu (TW)

( * ) Notice: Subject to any disclaimer, the term of this patent is extended or adjusted under 35 U.S.C. 154(b) by 232 days.

(21) Appl. No.: 14/300,240

(22) Filed: Jun. 10, 2014

(65) Prior Publication Data

US 2015/0086849 A1    Mar. 26, 2015

(30) Foreign Application Priority Data

Sep. 26, 2013 (TW) .............................. 102134829 A

(51) Int. Cl.
 *H01M 4/62* (2006.01)
 *C08G 77/455* (2006.01)
 (Continued)

(52) U.S. Cl.
 CPC ................ *H01M 4/62* (2013.01); *H01M 4/13* (2013.01); *H01M 4/139* (2013.01); *H01M 4/364* (2013.01);
 (Continued)

(58) Field of Classification Search
 CPC ............. H01M 4/62; H01M 10/0567; H01M 10/052; C08G 77/455; C08G 77/80
 USPC ......................................................... 429/163
 See application file for complete search history.

(56) References Cited

U.S. PATENT DOCUMENTS

| 8,142,918 B2 | 3/2012 | Boczer et al. | |
| 2008/0160405 A1* | 7/2008 | Yang | H01M 4/131 429/215 |

(Continued)

FOREIGN PATENT DOCUMENTS

| TW | I251361 | 3/2006 |
| TW | 200828658 | 7/2008 |

(Continued)

OTHER PUBLICATIONS

Pham, Quoc-Thai, Jung-Mu Hsu, Jing-Pin Pan, Tsung-Hsiung Wang, and Chorng-Shyan Chern. "Synthesis and Characterization of Phenylsiloxane-modified Bismaleimide/barbituric Acid-based Polymers with 3-aminopropyltriethoxysilane as the Coupling Agent." Polymer International 62 (2012): 1045-052.*

(Continued)

*Primary Examiner* — James Lee
(74) *Attorney, Agent, or Firm* — Jianq Chyun IP Office

(57) ABSTRACT

A preparation method of an oligomer-polymer is provided. A maleimide is reacted with a barbituric acid to form a first oligomer-polymer. The first oligomer-polymer is then reacted with a phenylsiloxane oligomer to form a second oligomer-polymer. The phenylsiloxane oligomer is a compound represented by formula 1:

$$\text{Ph-Si(OH)}_x\text{O}_y, \quad \text{formula 1,}$$

wherein x is 0.65 to 2.82 and y is 0.09 to 1.17.

10 Claims, 6 Drawing Sheets

---

A maleimide is reacted with a barbituric acid to form a first oligomer-polymer — S100

↓

The first oligomer-polymer is reacted with a phenylsiloxane oligomer to form a second oligomer-polymer — S102

(51) Int. Cl.
*H01M 10/052* (2010.01)
*H01M 10/0567* (2010.01)
*H01M 4/13* (2010.01)
*H01M 4/139* (2010.01)
*H01M 4/36* (2006.01)
*H01M 10/0585* (2010.01)

(52) U.S. Cl.
CPC ............ *H01M 4/366* (2013.01); *H01M 10/052* (2013.01); *H01M 10/0567* (2013.01); *H01M 10/0585* (2013.01); *Y02E 60/122* (2013.01); *Y02T 10/7011* (2013.01)

(56) References Cited

U.S. PATENT DOCUMENTS

2009/0142670 A1* 6/2009 Wang ............... H01M 2/162 429/330
2011/0143200 A1 6/2011 Lee et al.

FOREIGN PATENT DOCUMENTS

| TW | 201001781 | 1/2010 |
|---|---|---|
| TW | I332284 | 10/2010 |
| TW | I335917 | 1/2011 |
| TW | I338964 | 3/2011 |
| TW | I354579 | 12/2011 |
| TW | I360248 | 3/2012 |
| TW | I361822 | 4/2012 |
| TW | I372481 | 9/2012 |
| TW | I376828 | 11/2012 |
| TW | I377717 | 11/2012 |

OTHER PUBLICATIONS

"Office Action of Taiwan Counterpart Application", issued on Oct. 22, 2014, p. 1-p. 3.

Wang et al., "Self-polymerized membrane derivative of branched additive for internal short protection of high safety lithium ion on battery," Journal of Membrane Science, Feb. 15, 2011, pp. 165-170.

Li et al., "Electrochemical characterization of a branched oligomer as a high-temperature and long-cycle-life additive for lithium-ion batteries," Electrochimica Acta, Dec. 15, 2012, pp. 72-77.

Li et al., "Electrochemical performance and safety features of high-safety lithium ion battery using novel branched additive for internal short protection," Applied Surface Science, Nov. 15, 2012, pp. 306-311.

* cited by examiner

PREPARATION METHOD OF OLIGOMER-POLYMER AND LITHIUM BATTERY

CROSS-REFERENCE TO RELATED APPLICATION

This application claims the priority benefit of Taiwan application serial no. 102134829, filed on Sep. 26, 2013. The entirety of the above-mentioned patent application is hereby incorporated by reference herein and made a part of this specification.

BACKGROUND OF THE INVENTION

1. Field of the Invention

The invention relates to a preparation method of an oligomer-polymer, and more particularly, to a preparation method of an oligomer-polymer containing a maleimide and a lithium battery using the oligomer-polymer prepared by the preparation method.

2. Description of Related Art

Since primary batteries are not environment-friendly, the market demand for secondary lithium batteries with characteristics such as rechargeability, light weight, high voltage value, and high energy density has been growing in recent years. As a result, the current performance requirements for secondary lithium batteries such as light weight, durability, high voltage, high energy density, and high safety have become higher. In particular, secondary lithium batteries have very high potential in the application and expandability of light electric vehicles, electric vehicles, and the large power storage industry.

However, among the commercialized secondary lithium batteries in the general market, since lithium transition metal oxide is used as the cathode, the cathode readily reacts with the electrolyte solution in high temperature applications and becomes damaged. As a result, oxygen in the lithium metal oxide is released and becomes part of a combustion reaction. This is one of the main causes for the explosion, swelling, and performance degradation of the secondary lithium battery. Therefore, maintaining the structural stability of the cathode material continuously in high temperature applications is one of the desired goals of those skilled in the art.

SUMMARY OF THE INVENTION

The invention provides a preparation method of an oligomer-polymer. The oligomer-polymer prepared thereby can be applied in the cathode material of a lithium battery such that the lithium battery still has better performance in a high temperature environment.

The invention provides a preparation method of an oligomer-polymer including the following steps. A maleimide (MI) is reacted with a barbituric acid (BTA) to form a first oligomer-polymer. The first oligomer-polymer is then reacted with a phenylsiloxane oligomer to form a second oligomer-polymer. The phenylsiloxane oligomer is a compound represented by formula 1:

$$\text{Ph-Si(OH)}_x\text{O}_y \qquad \text{formula 1,}$$

wherein x is 0.65 to 2.82 and y is 0.09 to 1.17.

The invention further provides a lithium battery including an anode, a cathode, an isolation film, an electrolyte solution, and a package structure. The cathode and the anode are configured separately, and the cathode includes the second oligomer-polymer. The isolation film is disposed between the anode and the cathode, and the isolation film, the anode, and the cathode define a housing region. The electrolyte solution is disposed in the housing region. The package structure covers the anode, the cathode, and the electrolyte solution.

Based on the above, the second oligomer-polymer prepared by the preparation method of an oligomer-polymer of the embodiments of the invention can be applied in the cathode material of a lithium battery and form a protective layer on the surface of the cathode material, such that the lithium battery still has good and stable capacity, battery efficiency, and charge-discharge cycle life even in a high temperature operation.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
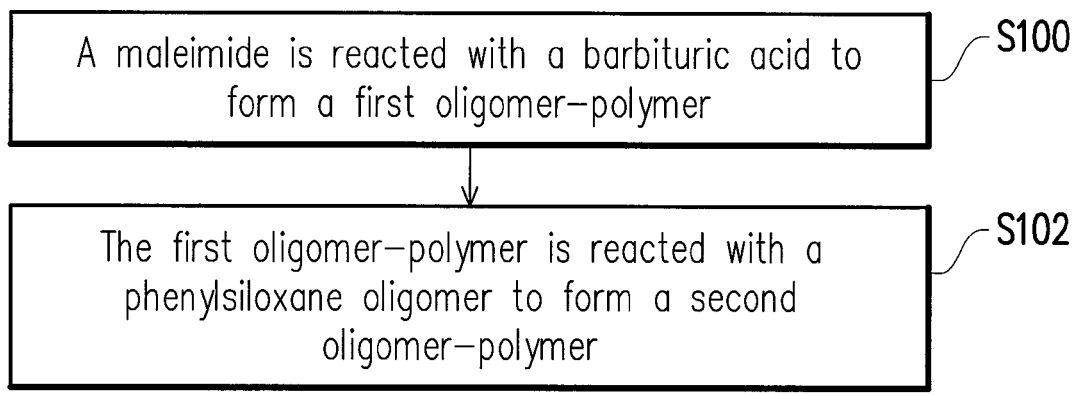
FIG. 1 is a preparation flowchart of an oligomer-polymer according to the first embodiment of the invention.

FIG. 1 is a preparation flowchart of an oligomer-polymer according to the first embodiment of the invention.

Referring to FIG. 1, step S100 is performed to react a maleimide with a barbituric acid to form a first oligomer-polymer. Specifically, addition polymerization of the maleimide and the barbituric acid can be proceeded through any known method. For instance, a Michael addition reaction can be used to polymerize the maleimide and the barbituric acid. In step S100, the molar ratio of the maleimide to the barbituric acid is about 10:1 to 1:1. In step S100, the maleimide and the barbituric acid can be reacted in a temperature between 50° C. and 150° C. In an embodiment, in step S100, the maleimide and the barbituric acid can be reacted in a temperature between 80° C. and 130° C.

The maleimide is, for instance, a mono-maleimide or a bismaleimide. The mono-maleimide is, for instance, selected from the group consisting of N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl)maleimide, and 2,6-xylylmaleimide. The bismaleimide can have the structure represented by formula 2:

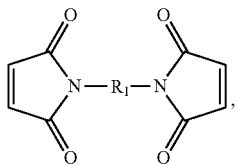

formula 2 in particular, $R_1$ includes:

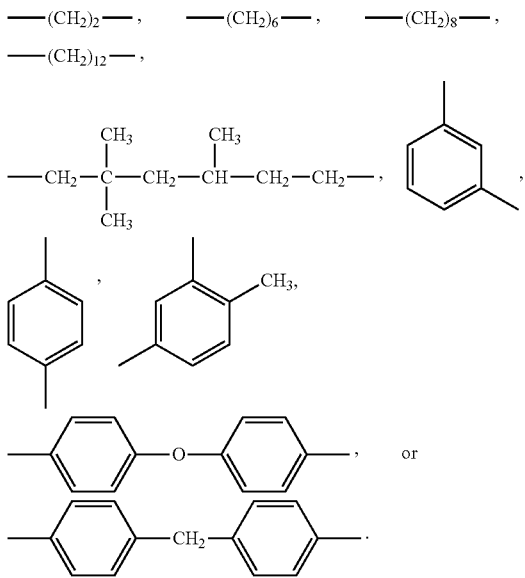

The barbituric acid can have the structure represented by formula 3:

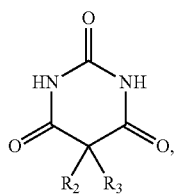

formula 3 wherein $R_2$ and $R_3$ are each independently selected from the group consisting of —H, —$CH_3$, —$C_2H_5$, —$C_6H_5$, —CH($CH_3$)$_2$, —$CH_2CH(CH_3)_2$, —$CH_2CH_2CH(CH_3)_2$, and —CH($CH_3$)—($CH_2$)$_2$—$CH_3$.

Moreover, the first oligomer-polymer formed in step S100 has a hyperbranched structure and has multi double bond reactive functional groups. The "hyperbranched structure" is formed by using maleimide as an architecture matrix and adding barbituric acid to the carbon-carbon double bonds of a portion of the maleimide through nucleophilic addition to perform branching and ordering polymerization reactions, in which the carbon-carbon double bonds of the maleimide can be opened up allowing the two carbon atoms or one of the two carbon atoms to bond with other atoms.

Moreover, the polymerization reaction of step S100 can be performed in the presence of a solvent. The solvent can be an organic solvent such as (but not limited to) N-methyl pyrollidone (NMP), γ-butylrolactone (GBL), or propylene carbonate (PC). The solvent can be used alone or in combination.

Next, step S102 is performed to react the first oligomer-polymer with a phenylsiloxane oligomer to form a second oligomer-polymer. Specifically, addition polymerization of the first oligomer-polymer and the phenylsiloxane oligomer can be proceeded through any known method. For instance, a Michael addition reaction can be used to polymerize the first oligomer-polymer and the phenylsiloxane oligomer. In step S102, the weight percentage of the first oligomer-polymer to the phenylsiloxane oligomer is about 80:20 to 20:80.

The phenylsiloxane oligomer is a compound represented by formula 1:

formula 1, wherein, x is 0.65 to 2.82 and y is 0.09 to 1.17. In an embodiment, in formula 1, x is 1.56 and y is 0.72. The synthesis method of the phenylsiloxane oligomer includes hydrolyzing phenyltrimethoxysilane (PhTMS) under an acidic condition, and then performing a condensation reaction, as shown in the following reaction formula I. In particular, Ph represents a phenyl group, x is 0.65 to 2.82, and y is 0.09 to 1.17.

reaction formula I

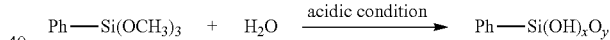

Moreover, the second oligomer-polymer formed in step S102 also has a hyperbranched structure. The "hyperbranched structure" is formed by using the first oligomer-polymer as an architecture matrix and adding the phenylsiloxane oligomer to the carbon-carbon double bonds of a portion of the maleimide in the first oligomer-polymer through nucleophilic addition to perform branching and ordering polymerization reactions, in which the carbon-carbon double bonds of the maleimide can be opened up allowing the two carbon atoms or one of the two carbon atoms to bond with other atoms.

Moreover, in an embodiment, before step S102 is performed, the preparation method can further include reacting the phenylsiloxane oligomer with a silane compound to form a modified phenylsiloxane oligomer. In particular, the molar ratio of the phenylsiloxane oligomer to the silane compound is 1:1 to 2:1. The silane compound is, for instance, an amino-silane compound or a vinyl-silane compound. In particular, examples of the amino-silane compound include 3-aminopropyltriethoxysilane (APTES), bis(3-triethoxysilyl-propyl)amine, bis(3-trimethoxysilyl-propyl)amine, 3-aminopropyl methyl diethoxysilane, 3-aminopropyl trimethoxysilane, triamino-functional propyl trimethoxy-silane, N-(n-butyl)-3-amino-propyl trimethoxysilane, N,N-dimethyl-4-(triethoxysilyl)aniline, 2-aminoethyl-3amino-propyl methyl dimethoxysilane, 2-aminoethyl-3-amino-propyl trimethoxysilane, or 3-methacryl oxypropyl-trimethoxysilane; examples of the vinyl-silane compound include vinyl silane, vinyl trichlorosilane, vinyl triethoxysilane, vinyl trimethoxysilane, or vinyltris(2-methoxyethoxy)silane. Specifically, condensation reaction of the phenylsiloxane oligomer and the silane compound can be proceeded through any known method. For instance, condensation reaction of the phenylsiloxane oligomer and the silane compound can be proceeded in a solvent in the presence of a catalyst. The catalyst is, for instance, dibutyltindilaurate (DBTDL), triethylamine, triethylenediamine, stannous octoate, dibutyltin di-(2-ethylhexoate), lead 2-ethylhexoate (24% Pb), sodium o-phenylphenate, potassium oleate, bismuth nitrate, tetra(2-ethylhexyl)titanate, stannic chloride, ferric chloride, ferric 2-ethylhexoate (6% Fe), cobalt 2-ethylhexoate (6% Co), cobalt naphthenate, zinc naphthenate (<8% Sn), antimony trichloride, tetramethyl butane diamine (TMBDA), 1,4-diazabicyclo-[2,2,2]-octane, tetra-n-butyltin, n-butyltin trichloride, trimethyltin hydroxide, or dimethyltin dichloride. The solvent can be an organic solvent such as (but not limited to) NMP, GBL, or PC. The solvent can be used alone or in combination.

It should be mentioned that, the second oligomer-polymer prepared by the preparation method can be applied in the cathode material of a lithium battery. More specifically, the second oligomer-polymer forms a protective layer on the surface of the cathode material, and the protective layer can effectively prevent damage to the cathode structure by the electrolyte solution in a high temperature environment, with the reason being: as described above, the second oligomer-polymer has a hyperbranched structure, and therefore the second oligomer-polymer can form a stable complex with the metal oxide in a conventional cathode material and be distributed on the surface thereof. Moreover, since the second oligomer-polymer has a rigid chemical structure, the protective layer formed can have thermal stability characteristics. Silicon-oxygen bonds in the structure can also speed up the transfer rate of lithium ions to improve battery performance. In this way, the lithium battery having a cathode material including the second oligomer-polymer can still have good capacity and battery efficiency in a high temperature environment and improve the cycle life of the battery.

The invention further provides a lithium battery including the second oligomer-polymer in the first embodiment.

Figure 2:
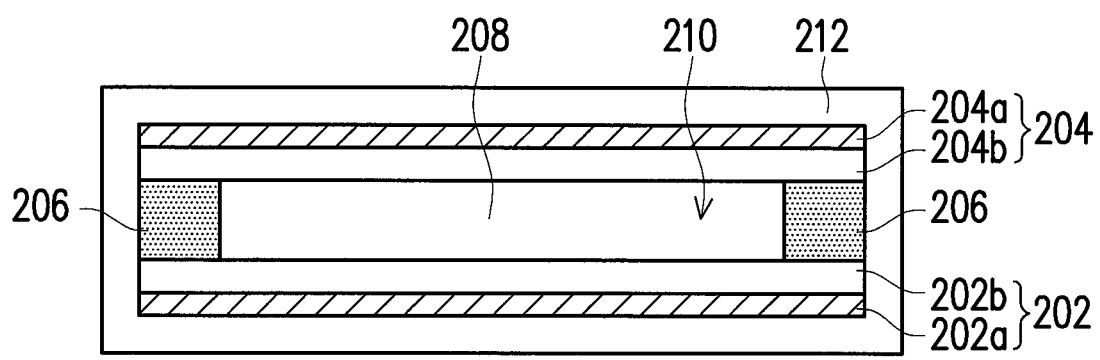
FIG. 2 is a schematic cross-sectional diagram of a lithium battery according to the second embodiment of the invention.

FIG. 2 is a schematic cross-sectional diagram of a lithium battery according to the second embodiment of the invention.

Referring to FIG. 2, a lithium battery 200 includes an anode 202, a cathode 204, an isolation film 206, an electrolyte solution 208, and a package structure 212.

The anode 202 includes an anode metal foil 202a and an anode material 202b, and the anode material 202b is disposed on the anode metal foil 202a through coating or sputtering. The anode metal foil 202a is, for instance, a copper foil, an aluminum foil, a nickel foil, or a high conductivity stainless steel foil. The anode material 202b is, for instance, carbide or metal lithium. The carbide used as the anode material 202b is, for instance, carbon powder, graphite, carbon fiber, carbon nanotube, graphene, or a mixture thereof.

The cathode 204 and the anode 202 are configured separately. The cathode 204 includes a cathode metal foil 204a and a cathode material 204b, and the cathode material 204b is disposed on the cathode metal foil 204a through coating or sputtering. The cathode metal foil 204a is, for instance, a copper foil, an aluminum foil, a nickel foil, or a high conductivity stainless steel foil. The cathode material 204b includes the second oligomer-polymer in the first embodiment and a lithium mixed transition metal oxide. In particular, based on 100 parts by weight of the cathode material 204b, the content of the second oligomer-polymer is, for instance, 0.1 parts by weight to 5 parts by weight, and the content of the lithium mixed transition metal oxide is, for instance, 85 parts by weight to 98 parts by weight. The lithium mixed transition metal oxide is, for instance, $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$, or a combination thereof, where $0<x<1$ and Mc is a divalent metal.

In an embodiment, the lithium battery 200 can further include a polymer binder, and the polymer binder reacts with the anode 202 and/or the cathode 204 to increase the mechanical properties of the electrode(s). Specifically, the anode material 202b can be adhered to the anode metal foil 202a through the polymer binder, and the cathode material 204b can be adhered to the cathode metal foil 204a through the polymer binder. The polymer binder is, for instance, polyvinylidene difluoride (PVDF), styrene-butadiene rubber (SBR), polyamide, melamine resin, or a combination thereof.

The isolation film 206 is disposed between the anode 202 and the cathode 204, and the isolation film 206, the anode 202, and the cathode 204 define a housing region 210. The material of the isolation film 206 is, for instance, an insulating material, and the insulating material can be polyethylene (PE), polypropylene (PP), or a multilayer composite structure of the materials, such as PE/PP/PE.

The electrolyte solution 208 is disposed in the housing region 210, and the electrolyte solution 208 includes an organic solvent, a lithium salt, and an additive. In particular, in the electrolyte solution 208, the content of the organic solvent is 55 wt % to 90 wt %, the content of the lithium salt is 10 wt % to 35 wt %, and the content of the additive is 0.05 wt % to 10 wt %.

The organic solvent is, for instance, GBL, ethylene carbonate (EC), PC, diethyl carbonate (DEC), propyl acetate (PA), dimethyl carbonate (DMC), ethylmethyl carbonate (EMC), or a combination thereof.

The lithium salt is, for instance, $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, or a combination thereof.

The additive is, for instance, mono-maleimide, polymaleimide, bismaleimide, polybismaleimide, a copolymer of bismaleimide and mono-maleimide, vinylene carbonate (VC), or a mixture thereof. The mono-maleimide is, for instance, selected from the group consisting of N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl) maleimide, and 2,6-xylylmaleimide. The bismaleimide can have the structure represented by formula 2 above.

The package structure 212 is used to cover the anode 202, the cathode 204, and the electrolyte solution 208. The material of the package structure 212 is, for instance, aluminum foil.

It should be mentioned that, the cathode material 204b of the lithium battery 200 includes the second oligomer-polymer and the lithium mixed transition metal oxide, and therefore, as described above, the second oligomer-polymer having a hyperbranched structure can form a stable complex with the lithium mixed transition metal oxide and form a protective layer on the surface of the lithium mixed transition metal oxide. Moreover, since the second oligomer-polymer has a rigid chemical structure, the protective layer formed can have thermal stability characteristics. Silicon-oxygen bonds in the structure can also speed up the transfer rate of lithium ions to improve battery performance. In this way, the lithium battery 200 having the cathode material 204b including the second oligomer-polymer can still have good capacity and battery efficiency in a high temperature environment and improve the cycle life of the battery. Moreover, the lithium battery 200 of the invention including the cathode 204 having a protective layer can be directly formed in a conventional battery manufacturing process by adding the second oligomer-polymer into the cathode material. Therefore, the capacity, battery efficiency, and charge-discharge cycle life of the lithium battery can be effectively maintained at high temperature without modifying any battery design, battery material, and electrolyte solution.

In the following, the characteristics of the lithium battery provided in the embodiments are described in detail with experimental examples.

EXPERIMENTAL EXAMPLE 1

Preparation of Anode

Metal lithium was cut into an appropriate shape and inserted directly to form the anode.

Preparation of Cathode

First, a phenylsiloxane oligomer was synthesized, and the synthesis method thereof includes the following steps:

117.60 g of water, 93.74 g of ethanol, and 31.60 g of an aqueous hydrochloric acid solution (weight percentage of 5 wt %, pH=1) were mixed and stirred in a 500 mL three-necked bottle. Next, 30.00 g of PhTMS was added to the mixed solution, and the mixed solution was heated to 60° C. in a water bath and stirred with a magnet to react for 1 hour. Then, the mixed solution was cooled to room temperature. Next, the phenylsiloxane oligomer (product) located in the lower layer was then separated and then washed with water repeatedly for 3 to 5 times, and then dissolved in acetone. In particular, the phenylsiloxane oligomer is represented by the following formula 1-1. Then, excess water was added to the mixed solution containing acetone to precipitate the phenylsiloxane oligomer again, and a suction filtration was performed to remove the phenylsiloxane oligomer. Next, the phenylsiloxane oligomer was dried in a vacuum oven for 12 hours at a controlled temperature of 60° C.

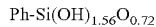

$$Ph-Si(OH)_{1.56}O_{0.72} \quad \text{formula 1-1}$$

Then, the second oligomer-polymer was synthesized, and the synthesis method includes the following steps:

1.325 g of the phenylsiloxane oligomer (represented by formula 1-1) and 0.21 g of APTES (molar ratio of 1:2) were dissolved in an NMP solvent, and 0.021 g of a DBTDL catalyst was added thereto. The mixed solution was mixed and stirred for 1 hour at 100° C. to prepare a solution containing the modified phenylsiloxane oligomer.

3.15 g of maleimide and 0.54 g of barbituric acid were added to 70.11 g of the NMP solvent. The mixed solution was mixed and stirred to react for 30 minutes at 80° C. to prepare a solution containing the first oligomer-polymer. In particular, the structural formula of the maleimide is represented by formula 2-1, and the structural formula of the barbituric acid is represented by formula 3-1.

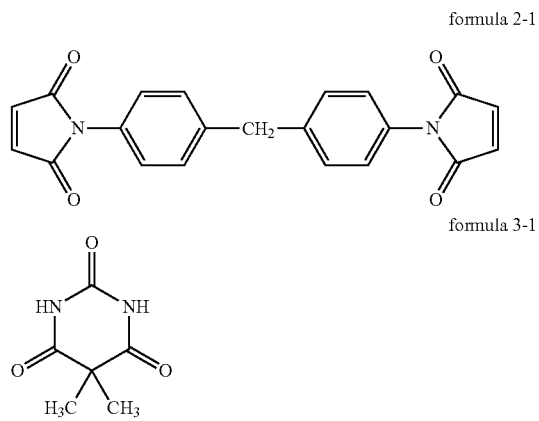

The solution containing the first oligomer-polymer and the solution containing the modified phenylsiloxane oligomer were mixed at a weight percentage of 4:1 and stirred to react for 30 minutes at 30° C. Next, ethanol was added to the mixed solution to precipitate the second oligomer-polymer (product), and a suction filtration was performed to collect the second oligomer-polymer. Then, the second oligomer-polymer was dried in a vacuum oven at room temperature to prepare the second oligomer-polymer of experimental example 1. It should be mentioned that, throughout the entire synthesis process of the second oligomer-polymer, the total solid content was maintained at 5 wt %.

After the second oligomer-polymer of experimental example 1 was synthesized, 90 parts by weight of $LiCoO_2$, 5 parts by weight of PVDF, and 5 parts by weight of acetylene black (conductive powder) were evenly mixed in the NMP solvent. Next, 0.5 parts by weight of the second oligomer-polymer was added to the mixed solution to form a cathode material. Then, after the material was coated on an aluminum foil, the aluminum foil with the material coated thereon was dried, compressed, and then cut to form the cathode.

Preparation of Electrolyte Solution 2 parts by volume of PC, 3 parts by volume of EC, and 5 parts by volume of DEC were mixed as the organic solvent in the electrolyte solution; $LiPF_6$ having a concentration of 1M was added as the lithium salt in the electrolyte solution; and VC was added as the additive in the electrolyte solution.

Fabrication of Lithium Battery

After using polypropylene as the isolation film to isolate the anode and the cathode and after the housing region was defined, the electrolyte solution was added to the housing region between the anode and the cathode. Lastly, the above structure is sealed with the package structure to complete the fabrication of the lithium battery of experimental example 1.

EXPERIMENTAL EXAMPLE 2

The difference between the lithium battery of experimental example 2 and the lithium battery of experimental example 1 is: the second oligomer-polymers used when preparing the cathodes are different. Specifically, the difference between the synthesis method of the second oligomer-polymer of experimental example 2 and the synthesis method of the second oligomer-polymer of experimental example 1 is: in experimental example 2, the temperature of the reaction between maleimide and barbituric acid for preparing the solution containing the first oligomer-polymer is 130° C., and in experimental example 1, the temperature of the reaction between maleimide and barbituric acid for preparing the solution containing the first oligomer-polymer is 80° C. Moreover, the other steps of preparing the cathode, the preparation of the anode and the electrolyte solution, and the fabrication of the battery are all the same as experimental example 1.

COMPARATIVE EXAMPLE

The difference between the lithium battery of the comparative example and the lithium battery of experimental example 1 is: the cathode of the comparative example does not include the second oligomer-polymer. Moreover, the other steps of preparing the cathode, the preparation of the anode and the electrolyte solution, and the fabrication of the battery are all the same as experimental example 1.

<Electrical Measurements>
Charge-Discharge Performance Test

Figure 3:
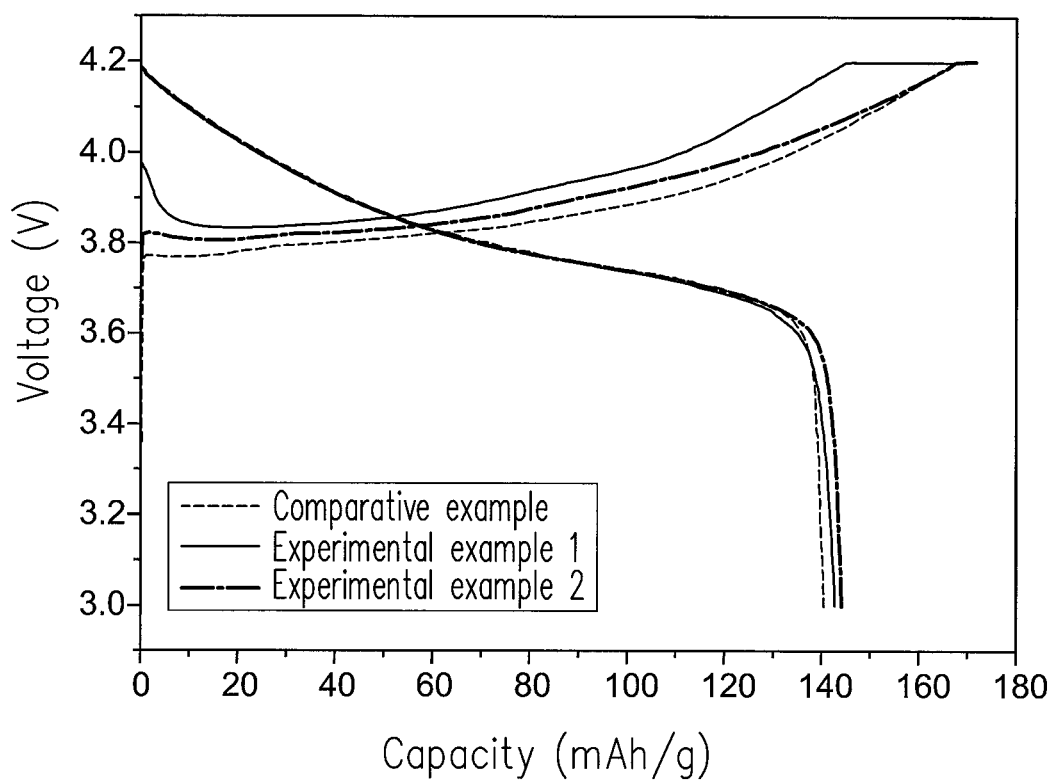
FIG. 3 is a curve diagram illustrating the relationship between capacity and voltage of the lithium battery of each of experimental example 1, experimental example 2, and the comparative example at room temperature.
Figure 4:
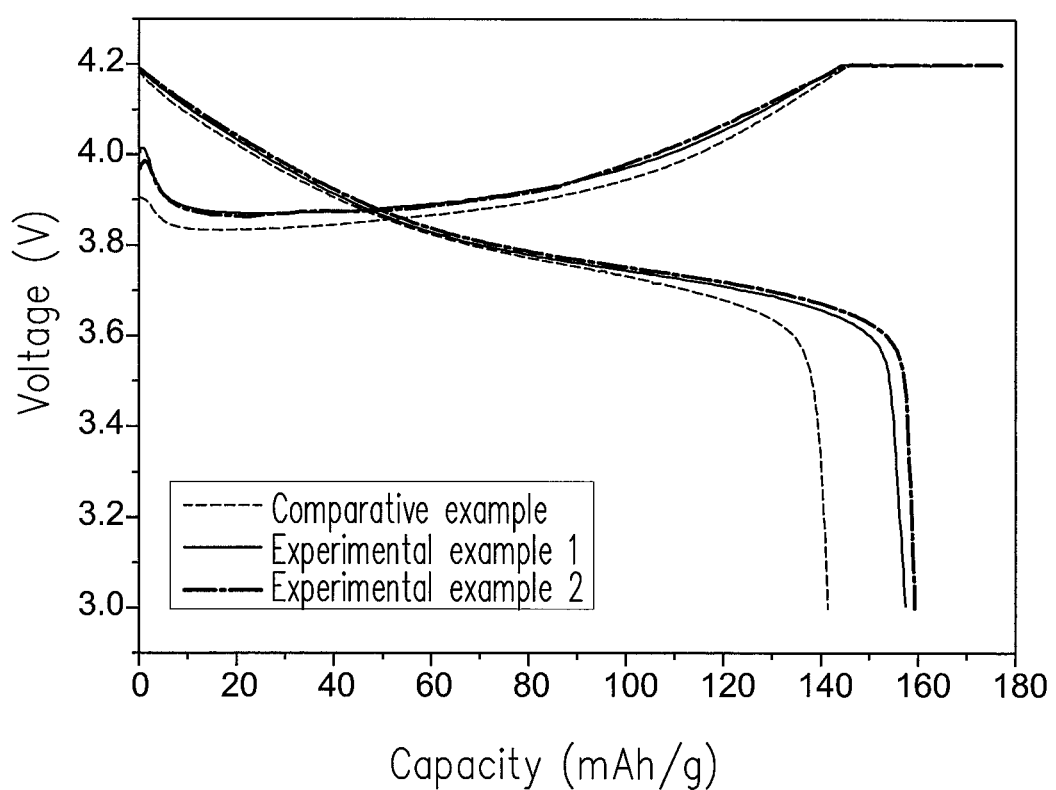
FIG. 4 is a curve diagram illustrating the relationship between capacity and voltage of the lithium battery of each of experimental example 1, experimental example 2, and the comparative example at 55° C.

The lithium battery of each of experimental example 1, experimental example 2, and the comparative example was charged and discharged with a constant current/voltage at room temperature (30° C.) and 55° C., respectively. First, the batteries were charged to 4.2 V with a constant current of 0.2 C until the current was less than or equal to 0.02 C. Then, the batteries were discharged to the cut-off voltage (3 V) with a constant current of 0.2 C. The battery capacity (milliamp hours per gram, mAh/g) and the irreversibility of the lithium battery of each of experimental example 1, experimental example 2, and the comparative example are as shown in the following Table 1. Moreover, FIG. 3 is a curve diagram illustrating the relationship between capacity and voltage of the lithium battery of each of experimental example 1, experimental example 2, and the comparative example at room temperature. FIG. 4 is a curve diagram illustrating the relationship between capacity and voltage of the lithium battery of each of experimental example 1, experimental example 2, and the comparative example at 55° C.

experimental example 2 having a cathode including the second oligomer-polymer is higher, and the irreversibility of the battery reactivity is smaller.

It can be known from Table 1 and FIG. 4 that, at a high temperature environment of 55° C., the discharge capacity of the lithium battery of each of experimental example 1 and experimental example 2 having a cathode including the second oligomer-polymer is increased to about 160 mAh/g. Moreover, in comparison to the lithium battery of the comparative example, the discharge capacity of the lithium battery of each of experimental example 1 and experimental example 2 having a cathode including the second oligomer-polymer is higher, and the irreversibility of the battery reactivity is smaller.

It can be known from the data that, in comparison to the lithium battery of the comparative example in which the cathode does not include the second oligomer-polymer, even in a high temperature environment of 55° C., the lithium battery of each of experimental example 1 and experimental example 2 having a cathode including the second oligomer-polymer still has good capacity and battery efficiency. In other words, the protective layer formed by the second oligomer-polymer of the invention on the surface of the cathode allows the cathode to maintain structural stability in a high temperature environment, such that the battery still has good performance.

Charge-Discharge Cycle Test

The lithium battery of each of experimental example 1, experimental example 2, and the comparative example was charged and discharged with a constant current/voltage at room temperature (30° C.) and 55° C., respectively. First, the batteries were charged to 4.2V with a constant current of 0.2 C until the current was less than or equal to 0.01 C. Then, the batteries were discharged to the cut-off voltage (3V) with a constant current of 0.2 C, and the above process was repeated 10 times. The battery capacity of the lithium battery of each of experimental example 1, experimental example 2, and the comparative example is as shown in the following

TABLE 1

| | Comparative example (room temperature) | Experimental example 1 (room temperature) | Experimental example 2 (room temperature) | Comparative example (55° C.) | Experimental example 1 (55° C.) | Experimental example 2 (55° C.) |
|---|---|---|---|---|---|---|
| Charge capacity of the 1st cycle (mAh/g) | 171 | 170 | 172 | 170 | 171 | 177 |
| Discharge capacity of the 1st cycle (mAh/g) | 141 | 143 | 144 | 141 | 157 | 159 |
| Irreversibility of the 1st cycle (%) | 17.5 | 15.9 | 16.3 | 17.1 | 8.2 | 10.2 |

Figure 5:
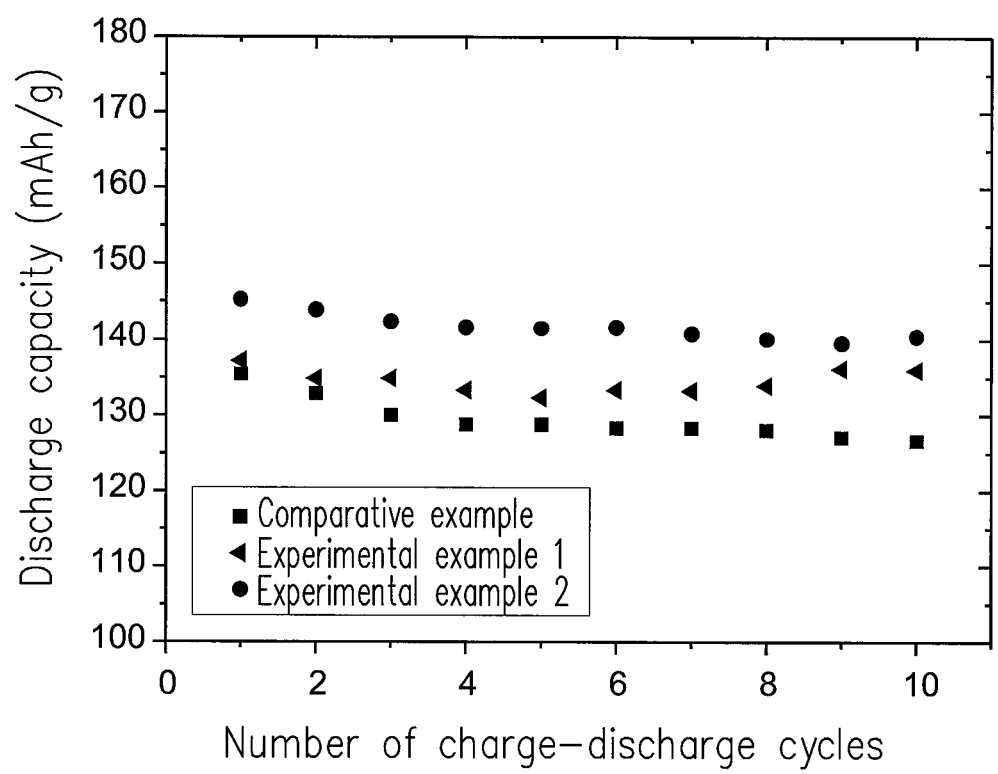
FIG. 5 is a diagram illustrating the relationship between the number of charge-discharge cycles and discharge capacity of the lithium battery of each of experimental example 1, experimental example 2, and the comparative example at room temperature.
Figure 6:
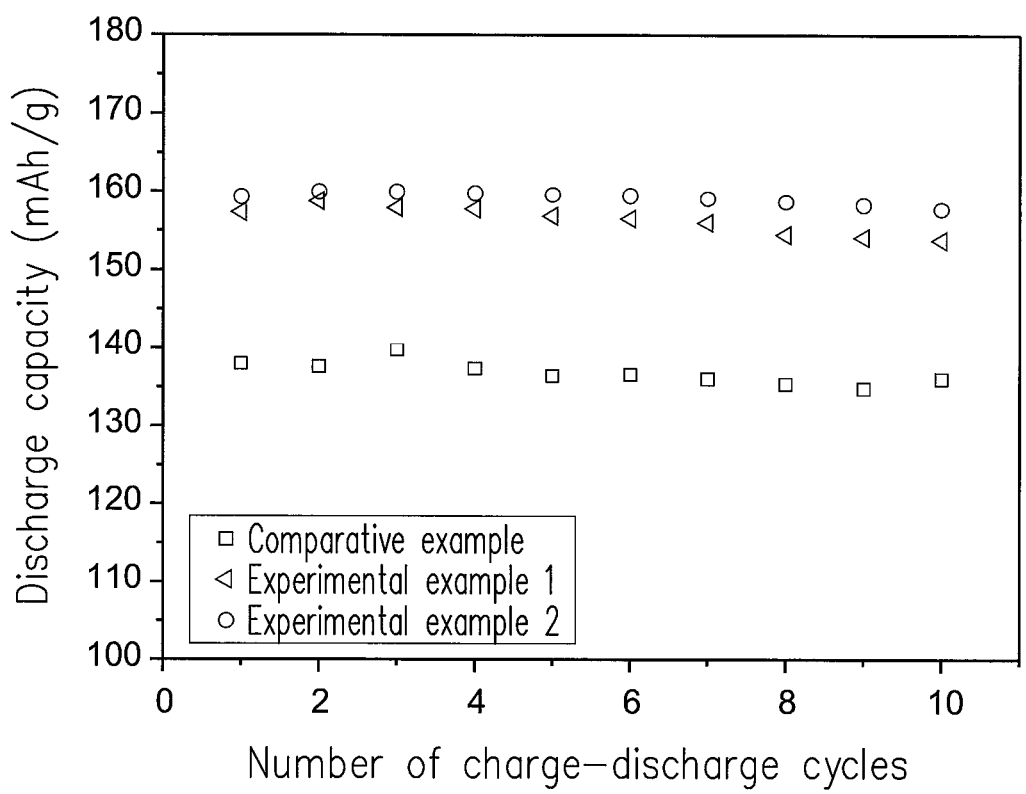
FIG. 6 is a diagram illustrating the relationship between the number of charge-discharge cycles and discharge capacity of the lithium battery of each of experimental example 1, experimental example 2, and the comparative example at 55° C.

It can be known from Table 1 and FIG. 3 that, at room temperature, the discharge capacity of the lithium battery of each of experimental example 1 and experimental example 2 having a cathode including the second oligomer-polymer is maintained at about 143-144 mAh/g, indicating the second oligomer-polymers do not affect battery characteristics. Moreover, it can be known from Table 1 and FIG. 3 that, at room temperature, in comparison to the lithium battery of the comparative example, the discharge capacity of the lithium battery of each of experimental example 1 and Table 2. Moreover, FIG. 5 is a diagram illustrating the relationship between the number of charge-discharge cycles and discharge capacity of the lithium battery of each of experimental example 1, experimental example 2, and the comparative example at room temperature. FIG. 6 is a diagram illustrating the relationship between the number of charge-discharge cycles and discharge capacity of the lithium battery of each of experimental example 1, experimental example 2, and the comparative example at 55° C.

TABLE 2

| | Comparative example (room temperature) | Experimental example 1 (room temperature) | Experimental example 2 (room temperature) | Comparative example (55° C.) | Experimental example 1 (55° C.) | Experimental example 2 (55° C.) |
| --- | --- | --- | --- | --- | --- | --- |
| Discharge capacity of the 1st cycle (mAh/g) | 136 | 137 | 146 | 137 | 158 | 160 |
| Discharge capacity of the 10th cycle (mAh/g) | 126 | 137 | 142 | 137 | 157 | 159 |

It can be known from Table 2, FIG. 5, and FIG. 6 that, in comparison to the lithium battery of the comparative example, at both room temperature and a high temperature environment of 55° C., the discharge capacity of the lithium battery of each of experimental example 1 and experimental example 2 having a cathode including the second oligomer-polymer is higher, and the irreversibility of the battery reactivity is smaller. Moreover, it can be known from the data that, even after 10 times of charge-discharge cycles in a high temperature environment of about 55° C., the lithium battery of each of experimental example 1 and experimental example 2 having a cathode including the second oligomer-polymer still has a stable discharge capacity and battery efficiency. In other words, the oligomer-polymer of the invention can indeed be accepted by the current lithium battery and improve the safety of the battery.

Based on the above, the second oligomer-polymer prepared by the preparation method of an oligomer-polymer provided by the invention can be applied in the cathode material of a lithium battery and form a protective layer on the surface of the cathode material, so as to prevent damage to the cathode structure by the electrolyte solution in a high temperature operation. Moreover, the lithium battery provided by the invention still has good and stable capacity, battery efficiency, and charge-discharge cycle life even in a high temperature operation, and therefore can be effectively applied in an environment such as the engine of an electric vehicle.

What is claimed is:

1. A preparation method of an oligomer-polymer, comprising:
    reacting a maleimide with a barbituric acid to form a first oligomer-polymer; and
    reacting the first oligomer-polymer with a phenylsiloxane oligomer to form a second oligomer-polymer, wherein the phenylsiloxane oligomer is a compound represented by formula 1:

$$Ph\text{-}Si(OH)_xO_y \qquad \text{formula 1,}$$

wherein x is 0.65 to 2.82 and y is 0.09 to 1.17.

2. The method of claim 1, wherein the first oligomer-polymer is reacted with the phenylsiloxane oligomer at a weight percentage of 80:20 to 20:80.

3. The method of claim 1, wherein the maleimide is reacted with the barbituric acid at a molar ratio of 10:1 to 1:1.

4. The method of claim 1, wherein a temperature of reacting the maleimide with the barbituric acid is between 50° C. and 150° C.

5. The method of claim 1, further comprising, before the first oligomer-polymer is reacted with the phenylsiloxane oligomer, reacting the phenylsiloxane oligomer with a silane compound, wherein the silane compound comprises an amino-silane compound or a vinyl-silane compound.

6. The method of claim 1, wherein the maleimide comprises a mono-maleimide or a bismaleimide, wherein the mono-maleimide is selected from the group consisting of N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl)maleimide, and 2,6-xylylmaleimide, and the bismaleimide has a structure represented by formula 2:

formula 2

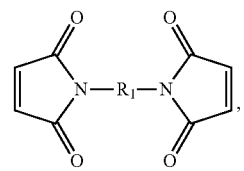

wherein $R_1$ comprises:

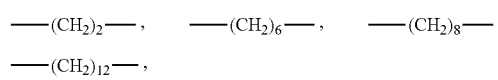

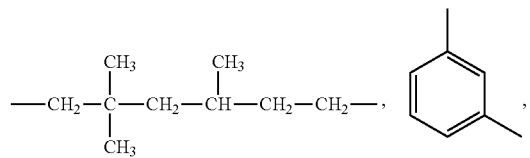

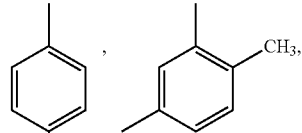

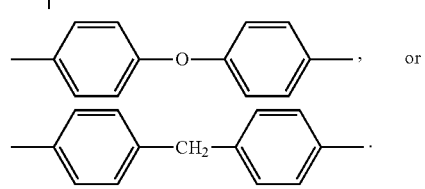

, or .

7. The method of claim 1, wherein the barbituric acid has a structure represented by formula 3:

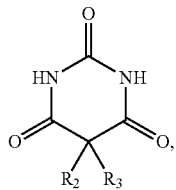

formula 3 wherein $R_2$ and $R_3$ are each independently selected from the group consisting of —H, —$CH_3$, —$C_2H_5$, —$C_6H_5$, —CH($CH_3$)$_2$, —$CH_2$CH($CH_3$)$_2$, —$CH_2CH_2$CH($CH_3$)$_2$, and —CH($CH_3$)—($CH_2$)$_2$—$CH_3$.

8. A lithium battery, comprising:
an anode;
a cathode configured separately from the anode, wherein the cathode comprises the second oligomer-polymer prepared by the method of claim 1;
an isolation film disposed between the anode and the cathode, wherein the isolation film, the anode, and the cathode define a housing region;
an electrolyte solution disposed in the housing region; and
a package structure covering the anode, the cathode, and the electrolyte solution.

9. The lithium battery of claim 8, wherein the electrolyte solution comprises an organic solvent, a lithium salt, and an additive.

10. The lithium battery of claim 9, wherein the additive comprises mono-maleimide, polymaleimide, bismaleimide, polybismaleimide, a copolymer of bismaleimide and mono-maleimide, vinylene carbonate, or a mixture thereof.

* * * * *